Sept. 30, 1947.  F. G. KELLY  2,428,229
METER CONTROL DEVICE AND SYSTEM
Filed Nov. 11, 1942
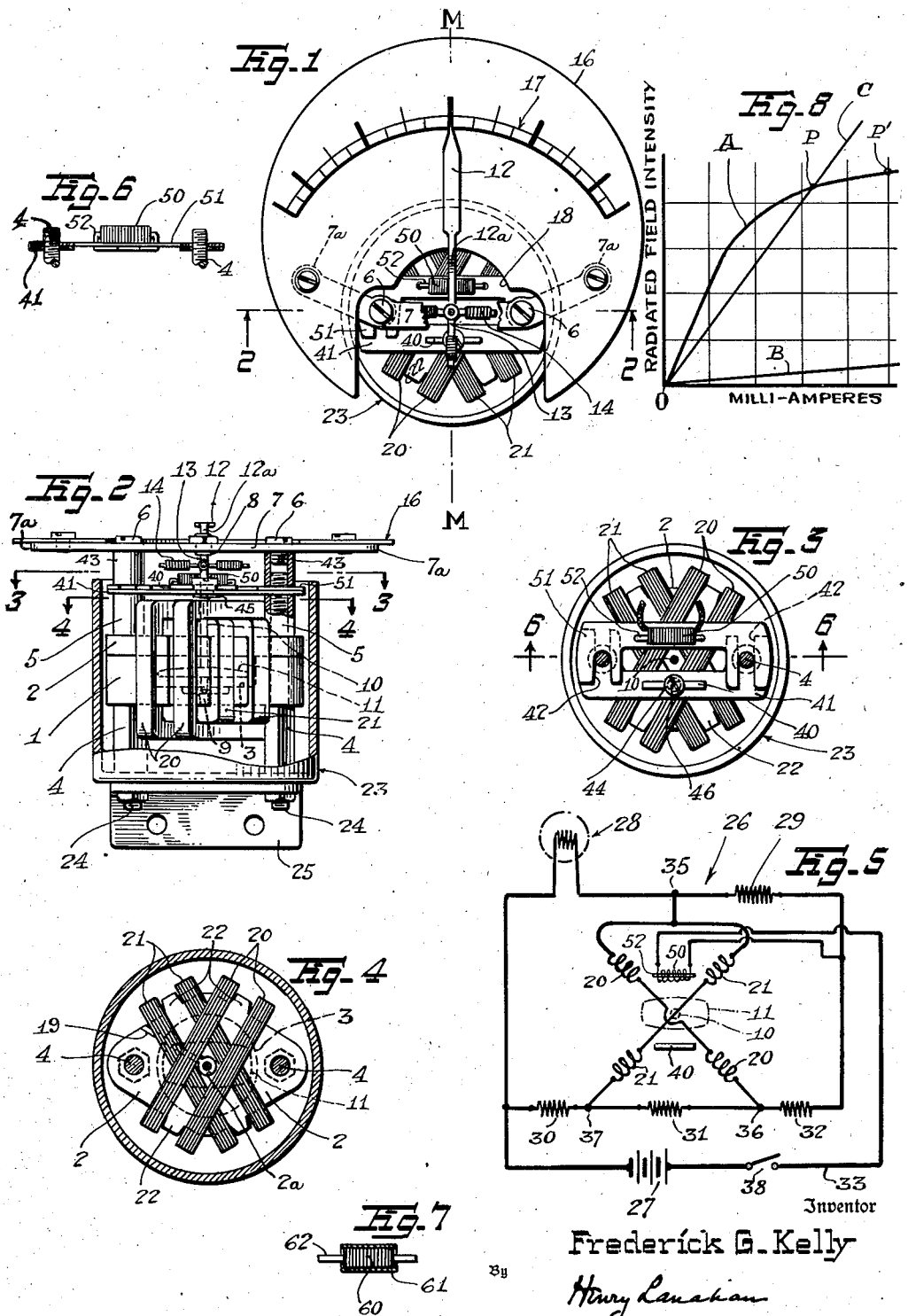
Inventor
Frederick G. Kelly
Henry Lanahan
Attorney Patented Sept. 30, 1947

2,428,229

UNITED STATES PATENT OFFICE 2,428,229

METER CONTROL DEVICE AND SYSTEM

Frederick G. Kelly, West Orange, N. J., assignor to Thomas A. Edison, Incorporated, West Orange, N. J., a corporation of New Jersey Application November 11, 1942, Serial No. 465,221

11 Claims. (Cl. 171—95)

This invention relates to magnetic systems. Among other uses, the invention has marked utility in connection with ratiometer systems and is herein particularly illustrated and described in connection with such meter systems.

The invention relates basically to novel means for utilizing a variable source of current to neutralize a fixed magnetic field and comprises employing a saturable electromagnetic means for this purpose.

In meter systems, permanent magnets constitute a highly simple and practical means for obtaining a meter-influencing magnetic field of substantially constant intensity as, for example, for producing a substantially fixed actuating or controlling force in the meter apparatus. Not infrequently, though, it is desirable that such a field or force be effectively neutralized or counteracted under certain conditions, and that this be done with a high degree of accuracy. This set of circumstances is particularly well exemplified in those meters of the type which utilize energizing current from a source independent of the quantity being measured but which are arranged to be essentially independent in their operation of variations in potential of that source. In these meters—a class of which is known as ratiometers—the position of the movable indicating means is determined by a balancing of opposing actuating torques, which torques are dependent alike on the energizing current but differentiated according to the quantity being measured. When the meter is not in use—it being then disconnected from the energizing current source—the actuating torques are no longer present and there is no restoring force applied to the movable indicating means. To prevent the needle of the movable indicating means from then drifting across the scale, there has been provided a small permanent magnet, or so-called drift-torque magnet, for establishing the movable indicating means of the instrument at a predetermined position. This drift torque is however fixed while the resultant actuating torque exerted on the movable indicating means according to the quantity being measured varies with changes in potential of the energizing current source. Because this results in a source of error, it is here highly desirable that the effective field of the drift-torque magnet be neutralized during meter operation.

I have devised an electromagnetic means for effectively neutralizing the constant field of a permanent magnet for such and other applications in measuring instruments as are above noted, which has the distinct advantage of not requiring a fixed or critically regulated potential source of current energization. My invention accordingly permits me to neutralize very accurately the permanent field effect of a meter magnet during meter operation, with the use of common sources of current supply and under varying conditions in respect of temperature, etc. Accordingly, I may advantageously utilize the current source for the instrument for exciting this neutralizing means—which typically may be a battery—and yet rule out substantially any source of error from the drift-torque magnet even though the battery potential varies through a normal working range as between values at charged and discharged conditions.

It is an object of my invention to provide a new and improved magnetic system adapted for advantageous use in, and in cooperation with, measuring or indicating apparatus and systems.

It is another object to provide an electromagnetic means effective under varying degrees of energization for neutralizing a constant magnetic field in a measuring instrument.

It is another object to produce a stable meter-influencing electromagnetic field under varying operating conditions in respect of energizing current, temperature, etc.

It is another object to provide an improved drift-torque arrangement including simple and effective means to counteract the drift torque during meter operation.

It is another object to provide an improved drift-torque arrangement for a ratiometer including means energizable by a current source for the meter, having a normal working potential range to produce a substantially constant and complete annulment of the drift torque during meter operation throughout that range.

It is another object to provide improvements for controlling and stabilizing the effective field of a magnetic system.

Other and allied objects of my invention will more fully appear from the following description and the appended claims.

In the description of my invention reference is had to the accompanying drawings, of which:

Figure 1 is a view, with a part broken away, of a ratiometer illustrating my invention;

Figure 2 is a side view of that ratiometer with parts appearing in section on the line 2—2 of Figure 1;

Figure 3 is a sectional view taken on the line 3—3 of Figure 2;

Figure 4 is a sectional view taken on the line 4—4 of Figure 2;

Figure 5 is a diagrammatic representation of a circuit arrangement and meter according to my invention;

Figure 6 is a fractional sectional view taken on the line 6—6 of Figure 3;

Figure 7 is a detailed view partly sectional, of an alternative embodiment of a magnetic neutralizing means according to my invention; and Figure 8 is a group of comparative curves illustrating certain features of my invention.

The ratiometer shown in the accompanying drawings and illustrating my invention includes a damping box as its base-forming element. This damping box comprises a shallow cup-shaped member 1 and a cover plate 2 made of a conducting material such as of copper and enclosing a cylindrical space 3. The member 1 is seated on a pair of stud bolts 4 which pass through diametrically opposite thick-walled portions of the member, and the cover plate 2 is clamped in place by bushings 5 which thread onto upper end portions of the stud bolts. Held to the ends of the stud bolts by screws 6 is a cross bar 7 at the center of which there is provided a top bearing 8 for the meter. In the bottom wall of the damping box member 1, at the center of the cylindrical space 3, is a second bearing 9. In these bearings, and passing through a suitably over-sized aperture 2a in the cover plate 2, there is the movable indicating means of the meter.

This movable indicating means comprises a spindle 10 carrying a permanent bar magnet 11 within the enclosed space 3 of the damping box, the magnet being held at its center to the spindle, in a plane normal to the axis of the spindle, and being preferably made of one of the highly efficient magnet materials such as that known commercially as "Alnico." Secured to the spindle 10 just below the top bearing 8 is an indicating pointer or needle 12. This needle has its outer end portion offset upwardly, as at 12a, so as to overlie a disk member 16 carried by extensions 7a of the cross bar 7, and register with a scale 17 provided on that disk member, there being a cutaway 18 in the disk member to clear it from the needle and to expose the aforementioned mounting screws 6. Carried also by the spindle is a cross-shaped member 13 having weights 14 (in the form of coil springs) adjustably mounted thereon, which are for balancing the moving system.

When the movable indicating means of the meter is assembled in relation to the damping box, the spindle 10 passes through the aforementioned aperture 2a of the cover plate 2. In order that the spindle may be placed into that aperture after both the magnet and needle have been secured thereto, there is provided a "spindle-passing" slot 19 in the cover plate from the aperture 2a to the periphery thereof.

In meters of the character described the magnet of the movable indicating means is under influence of opposing magnetic fields respectively subjecting the magnet to actuating torques in opposite directions, and the indicating position of the movable indicating means is established by the relative intensities of these fields, each indicating position being one wherein these opposing torques are in balance. When the respective magnetic fields are substantially symmetrical about the pivot axis of the magnet as a center, their resultant field may be represented as a vector passing through the pivot axis—the direction being that in which the net field is strongest—and the angular position assumed by the magnet is one wherein its magnetic axis (its longitudinal center line, in the present case) is in line with that resultant vector. Purely by way of example, I show two pairs of coils 20 and 21 so positioned on the damping box as to produce superimposed electromagnetic fields which are substantially symmetrical about the pivot axis of the magnet, each pair consisting of two parallel coils placed closely to the spindle 10 at the opposite sides thereof with the medial plane of each pair in alignment with the spindle axis. The coil pairs are localized, by abutments 22 on the damping box, in positions wherein their medial planes are inclined as at ±30° (that is in clockwise and counterclockwise directions) from the center line M—M through the meter (see Figure 1), the axes of the coil pairs being then displaced by ±60° from that center line. Of course, when the coil pairs are so inclined one pair passes through the other as is shown.

In order that the magnet 11 may not be influenced by stray magnetic fields, the coil and magnet assembly is placed within a shield cup 23 of a high-permeability and a low-hysteresis material. This assembly may for example be held to the cup by way of the stud bolts 4, there being reduced-diameter end portions of the stud bolts passing through the base of the cup and held thereto by nuts 24. Exteriorly of the cup is a bracket 25, held to the cup also by the nuts 24, for mounting the instrument to a suitable support.

When a current is passed through only one of the two pairs of coils 20 and 21—it being understood that both coils of the pair are energized to have the same magnetic polarity—the magnet will align itself with the axis of that pair. For instance, when a current is passed through coil pair 20—the pair whose axis is displaced 60° counterclockwise from the center line abovementioned—and the direction of current flow in the coil pair is selected in the appropriate one of its two possible directions, the magnet alignment with the axis of the coil pair will be such as to place the needle in registration with the left extremity of the scale 17. When current is then next passed through only the coil pair 21, and the direction of current flow appropriately chosen, the magnet will be shifted 120° clockwise to place the needle in registration with the right extremity of the scale. For intermediate conditions wherein both coils are energized, each in the appropriate direction above outlined, the magnet will assume an intermediate angular position wherein its magnetic axis is in alignment with the resultant field of both coils, as aforementioned. This position will depend of course on the ratio of the currents in the coil pairs, and the position of registration of the needle on the scale will be in accordance with that ratio.

The coil pairs 20 and 21 are differentially energized in accordance with variations in a quantity to be measured by means of an electrical bridge 26 as is shown in Figure 5. This bridge may, for example, comprise an upper branch circuit serially including resistors 28 and 29 and a lower branch circuit serially including three resistors 30, 31 and 32. These branches are joined at the ends in parallel arrangement and are connected by leads 33 to a suitable source of potential, say a battery 27. The coil pairs 20 and 21, of which the respective coils may be in serial arrangement, are connected across the branches of this electrical bridge, the coil pair 20 being connected from a junction point 35 between resistors 28 and 29 of the upper branch to a junction point 36 between resistors 31 and 32 in the lower branch, and coil pair 21 being connected from that junction point 35 to a junction point 37 between resistors 30 and 31 in the lower branch. The coil pairs and the middle resistor 31 of the lower branch form thus what may be considered an electrical delta of which the coil pairs 20 and 21 constitute the respective right and left sides and the resistor 31 at the bottom side.

Each of the resistance elements in the bridge 26 above-mentioned are considered as having fixed values except for the resistor 28 in the upper branch. The resistance of this element is variable and may be considered to be the quantity measured by the meter system; however, that resistance may be varied as a function of any other suitable quantity and the scale may then be suitably calibrated in terms of that quantity. For example, the resistor element 28 may constitute the active element of a thermometer bulb, such as is disclosed in my patent application Serial No. 346,892, and the scale may then be calibrated in temperature.

When the resistor element 28—now hereinafter referred to as the bulb element—is varied, the potential of junction point 35 in the upper branch will shift relative to the fixed potentials in the lower branch. For example, for a given lower value of resistance for the bulb element 28, the potential of junction point 35 will be equal to that of junction point 37 and there will be zero potential applied across coil pair 21; coil pair 20 will now however have a potential across it equal to the drop across the central resistor 31 in the lower branch and, when connected in the bridge circuit to have the appropriate direction of magnetic polarity, as is above outlined, will align the magnet with its axis to place the needle 12 in registration with the left extremity of the scale. On the other hand, for a given maximum value of resistance for the bulb element 28, the potential of junction point 35 will be made equal to that of junction point 36 in the lower branch and coil pair 20 will have zero potential applied across it; coil pair 21 will now however be energized by the potential drop across resistor 31 and, when connected for appropriate polarity, will align the magnet with its axis to place the needle into registration with the right extremity of the scale. As the bulb element 28 varies in resistance between these upper and lower values above considered, both coil sets will be energized. In all cases, however, the variation in potential across the coil sets will be such that the algebraic sum of these potentials is equal to the potential drop across the central resistor 31 of the lower branch. Changes in resistance of the bulb element 28 thus produce changes in ratio of current energization of the two coil pairs. These changes are represented in terms of angular deflections of the magnet 11, and will be in accordance with the temperature variations creating the changes in resistance of the bulb element, thus permitting a direct calibration of the scale in terms of temperature.

During periods when the meter system is not in use, the battery 27 will be disconnected from the bridge 26, as by means of a suitable on-off switch 38, so that there may not be any wasteful current drain on the battery. The coil pairs 20 and 21 will of course be then not energized and the movable indicating means of the meter will tend to drift over the scale. However, in order that the needle 12 may be established in a predetermined position when the meter is not in use, typically a position at the left extremity of the scale, there is provided an auxiliary means to subject the movable indicating means to a torque bias, or drift torque, in a counterclockwise direction. This drift torque has been very simply obtained by means of a small bar magnet 40, as of tungsten magnet steel, placed substantially at right angles to the center plane M—M above mentioned, at a small spacing from the spindle 10 just above the coils of the meter (see Figures 2 and 3). A suitable mounting for this drift-torque magnet 40 may comprise a non-magnetic plate 41 having open-ended slots 42 in its end portions by which it may embrace the upper end portions of the stud bolts 4 and be clamped thereto as between the aforementioned bushings 5 and upper bushings 43 provided on the stud bolts. (It is into these upper bushings 43 that the aforementioned mounting screws 6 are threaded.) The drift-torque magnet 40 is held to the central part of this mounting plate by means of a short pin 44 having an upper head seated on the plate and a reduced diameter shank passing through the plate and riveted thereto as at 45 (see Figure 2). The magnet 40 extends diametrically through the head portion of this pin, and is held suitably thereto as by soldering. In the top of this head portion there is a cross slot 46 adapted to permit angular adjustment of the magnet 40 about the axis of the pin 44 as a center, as by means of a screw driver, the riveting of the pin to the mounting plate being of such a degree of tightness as readily to permit such angular adjusting of the magnet while yet to hold the magnet securely in any of its adjusted positions.

It will be noted that changes in potential of the battery 27 will produce corresponding variations in intensity of the resultant field of the two coil pairs, but will not produce changes in direction of that resultant field since the component fields will vary alike with changes in battery potential. The variation in intensity of the resultant field reflects itself as a change in effective actuating torque—that is, in the amount of torque which will be exerted on the movable indicating means to restore it to a true indicating position when the indicating means has been once deflected by a given amount from such position. Constant torque effects applied to the movable indicating means will therefore, if they are of sufficient magnitude, cause the meter calibration to vary with changes in potential of the meter-energizing current source. For this reason it is highly desirable that the action of the drift-torque magnet 40 be effectively counteracted during meter operation.

According to my invention, I am enabled to effectively counteract the action of the drift-torque magnet 40, or of any other meter-influencing permanent magnet; this I do by very simple electromagnetic means spaced from that magnet but arranged in magnetically opposed relation thereto. As an advantageous and preferred arrangement of my invention, this electromagnetic means is connected in the meter system so that it will be energized automatically during meter operation by the current source for the meter, thus permitting the drift-torque magnet 40 to be automatically restored to effective condition when the meter is disconnected from its energizing source. Moreover, it is a distinct feature of my invention that the radiated flux of this electromagnetic means be stabilized to produce a substantially constant and complete neutralization of the effective drift-torque magnetic field within a range of varying current energization of the electromagnetic means—a range, for example, such as would be produced by the use of ordinary sources of current supply.

This electromagnetic neutralizing means comprises a small coil 50 mounted at the side of the spindle 10 opposite the drift-torque magnet 40 in substantially axially parallel relation to the longitudinal axis of the drift-torque magnet. The coil is mounted on a non-magnetic plate 51, such as the mounting plate 41 aforementioned, which is clamped to the stud bolts 4 by the bushings 5 and 43. This coil has a saturable magnetic element associated therewith which is adapted to stabilize its radiated field with changing current energization. The magnetic element may suitably comprise a core element 52 made of a high-permeability soft iron and having its extremities extending beyond the coil ends. Preferably, I fold these core-element extremities downwardly to pass through appropriately spaced apertures in the mounting plate 51, and have the extremities then bent toward one another so as, in effect, to staple the coil to the mounting plate.

The coil 50 may be serially connected in the current supply lead 33 which runs from the battery 27 to the bridge 26, and is so polarized as to produce a magnetic field opposite in polarity to that of the drift-torque magnet—that is, a field which will effectively neutralize the field of that magnet. This condition requires, of course, that the magnetic axes of the coil and magnet be substantially parallel. However, critical positioning of the coil is obviated by provision for adjustment of the drift-torque magnet as has been hereinbefore outlined.

In practicing my invention, the coil 50 and core element 52 are so designed that when the coil is energized by a medial value of current—the current supplied the bridge 26 when the battery 27 is half way between charged and discharged conditions—the core element will be substantially saturated and there will be radiated a flux field just sufficient to neutralize the effective field of the drift-torque magnet. A satisfactory design fulfilling these conditions may typically be as follows:

With a drift-torque magnet made of properly magnetized tungsten magnet steel in the form of a rod .020" dia. and $\frac{7}{16}$" long, and with a medial value of energizing current for the neutralizing means of about 29.5 ma., the coil 50 may comprise 1200 turns of #42 enamelled copper wire wound random over a length of about $\frac{5}{16}$", and the core element 52 may comprise a soft iron wire .020" dia. having such length as to permit the wire to be stapled to the mounting plate 51, as above described, while yet obtaining a small overlap of the wire extremities (see Figure 6).

The advantages in providing the neutralizing core with a saturated core element are severalfold, and may be clearly understood by reference to the set of comparative characteristics shown in Figure 8. Characteristic A is here a plot of "radiated magnetic field intensity against current energization" for the magnetic-cored coil 50—52. It will be seen that this characteristic has the form of the usual B—H curve for a magnetic material, it comprising a first straight-line portion of relatively steep slope, an intermediate "knee" portion indcating increasing saturation of the magnetic core, and a then second straight-line portion of very moderate slope. Also, in Figure 8 there is a plot B, to the same scale, of "radiated magnetic field intensity against energizing current" for the coil 50 when the same has an air core. In comparing these two characteristics it will be observed that characteristic A, beyond its knee portion, approaches asymptotically the slope of characteristic B. This observation is significant to a clear understanding of the effect of the saturated core element, for it indicates that the radiated flux of the magnetic-cored coil is the sum of two distinct components: a small component according to characteristic B which represents the radiation of the coil itself, and a many times greater component representing the radiation of the magnetic core, which reaches a limiting value as the iron core becomes saturated. This second component has two highly desirable effects: First, it greatly increases the efficiency of the coil to radiate flux and thus permits a great reduction in size of coil required to produce the required neutralizing field effect. Secondly, it permits that increased neutralizing field effect to be obtained with a greatly improved regulation in flux radiation with changes in energizing current. These effects may be observed pictorially by reference to the set of comparative characteristics shown in Figure 8.

A typical operating point on curve A, for the medial value of energizing current of 29.5 ma. above considered, is beyond the knee of the curve as at point P. Curve A has at this point an approximately fourteen times greater value (in magnetic field intensity) than does characteristic B for the same value of energizing current. Yet the slope of curve A at point P is very moderate, indicating a good regulation in flux radiation. For example, I find that a ±15% variation in energizing current from the medial value abovementioned produces only approximately a ±3% variation in flux radiation, indicating that within this current range a deviation from a condition of true neutralization is by only the ±3%. This is however not a limiting value in regulation for the coil and core arrangement 50—52, for by working at a higher point on curve A where the slope will be substantially equal to that of characteristic B, as at P', there may be obtained a yet better regulation.

Were the neutralizing magnetic field at point P to be obtained by an air-cored coil, that coil would have a characteristic represented by the straight line C running from the origin O through the operating point P. The slope of this characteristic is approxmately five times as steep as that of characteristic A at point P. This indicates that the air-cored coil would have only one-fifth as good regulation in flux radiation as does the magnetic cored coil 50—52.

It has been noted that the variation in flux radiation of a saturated magnetic cored coil, with change in energizing current of the coil, is due to the radiation of the coil itself. I find that this coil radiation may however be confined, without however doing so with the radiation from the saturated magnetic core, so that there may be obtained a well-nigh perfect regulation in flux radiation. This is, for example, accomplished by the magnetic cored arrangement shown in Figure 7. Here, a neutralizing coil 60 is provided with a tubular magnetic shield 61 of a low-permeability and low-hysteresis material, the shield being for instance open-ended and terminating substantially at the coil ends. Extending through the coil is a magnetic core 62, which may be a soft iron wire as in the embodiment above described. This magnetic core is separate from the shield and has end portions extending beyond the region of action of the shield, these end portions serving as elements for radiating flux to the outside regions. In this arrangement, the coil and core are designed so that when a normal energizing current is passed through the coil the core 62 will be saturated and the flux-radiating end portions of the core will produce the desired value of radiated flux field.

I have herein shown and described my invention in terms of certain preferred embodiments and of a particular use thereof, but I intend no unnecessary limitation of my invention thereto, as these are illustrative and not limitative of the scope of my invention, which I endeavor to express according to the following claims.

I claim:

1. In a meter system of the type utilizing energizing current from a source having a working potential range and said meter system including an indicating pointer, a pivoted main magnet connected to said pointer, and coil means energized by said source according to variations in a quantity to be measured for actuating said magnet: the combination of an auxiliary magnet for biasing said main magnet to a predetermined angular position; means energized by said source for counteracting the action of said auxiliary magnet on said main magnet during meter operation; and means associated with said counteracting means for causing the action thereof to be substantially stabilized within the said potential range of said current source.

2. In a meter including a pivoted indicating pointer, a main magnet connected thereto, coil means for actuating said magnet and a circuit system for connecting said coil means to a current source: the combination of an auxiliary magnet effective on said main magnet to bias it to a predetermined angular position; and a coil connected in said circuit system for energization by said source and disposed in magnetically opposed relationship to said auxiliary magnet to effectively neutralize the field of the latter, said coil having a saturated magnetic core rendering the effectiveness of the core substantially independent of variations in potential of said current source.

3. In a ratiometer system including a pivoted indicating pointer and a main magnet connected thereto, a plurality of coils for actuating said magnet and a circuit arrangement connecting the said coils to a current source and for differentiating the energization of said coils in proportion to a quantity to be measured, said current source being characterized as having a range in working potential: the combination of an adjustably mounted auxiliary magnet for biasing said main magnet to a predetermined position; and an auxiliary coil, connected in said circuit arrangement for energization by said current source during meter operation, for effectively neutralizing the field of said auxiliary magnet, said coil having a magnetic core adapted to be substantially flux-saturated within the working potential range of said current source.

4. In a ratiometer having a pivoted pointer, a main magnet connected to said pointer and an auxiliary magnet for subjecting said main magnet to a predetermined torque bias: a magnetic-field-producing coil means having a magnetic core and arranged in magnetically opposed relationship to said auxiliary magnet, said coil means being energized to substantially neutralize the effective field of said auxiliary magnet and said magnetic core being adapted to be substantially saturated when the coil is so energized.

5. In a ratiometer having a pivoted pointer, a main magnet connected to said pointer and an auxiliary magnet for subjecting said main magnet to a predetermined torque bias: a magnetic-field-producing means for neutralizing the effective field of said auxiliary magnet, said means comprising a coil, a shield exterior to the coil for confining its radiated flux field, and a substantially saturated magnetic element associated with the coil, said magnetic element having a flux-radiating end portion spaced from said shield and extending outside the region of action thereof.

6. In a meter having a movable element responsive to a magnetic field: the combination of permanent-magnetic means having a field for biasing said element; saturable electro-magnetic means which when saturated substantially neutralizes the field of said permanent-magnet means; and current-supplying means for substantially saturating said electromagnetic means.

7. In a meter having movable indicating means responsive to a magnetic field and means associated with said indicating means for moving the latter: the combination of a permanent-magnet means for biasing said indicating means to a predetermined position during non-use of the meter; and electro-magnetic means energized during use of the meter for substantially neutralizing the field of said permanent-magnet means.

8. In a ratiometer system including a circuit adapted for connection across a current source, movable indicating means and means connected in said circuit and energized by said source during meter operation for moving said indicating means according to a condition to be measured: the combination of means for biasing said indicating mean to a predetermined position; and means, associated with said circuit and energized during meter operation, for rendering said biasing means ineffective.

9. In a ratiometer system including a circuit adapted for connection across a current source, movable indicating means and means connected in said circuit and energized by said source during meter operation for moving said indicating means according to a condition to be measured: the combination of means for biasing said indicating means to a predetermined position; means, connected to said circuit and energized during meter operation, for rendering said biasing means ineffective; and means, associated with said last-stated means, for rendering the latter substantially independent within a range of current variation of said source.

10. In a meter system of the type which utilizes energizing current from a source having a working-potential range, said meter system including a meter having an indicating means responsive to a magnetic field and means for moving said indicating means according to variations in a quantity to be measured: the combination of permanent-magnet means for biasing said indicating means to a predetermined position; and electromagnetic means connected in said system and energized by said source during use of the meter, for neutralizing the field of said permanent-magnet means, said electromagnetic means including saturable means for stabilizing the neutralizing action thereof with variation in current supply from said source.

11. In a meter system of the type which utilizes energizing current from a source having a working-potential range, said meter system including a meter having an indicating means responsive to a magnetic field and means for moving said indicating means according to variations in a quantity to be measured: the combination of permanent-magnet means for biasing said indicating means; and electromagnetic means connected in said system and energized by said source during use of the meter, for neutralizing the field of said permanent-magnet means, said electromagnetic means comprising a magnetic element substantially saturated by current-energization from said source throughout said potential range for maintaining the neutralizing action of the electromagnetic means at a substantially constant value irrespective of potential variations of said source through said range.

FREDERICK G. KELLY.

REFERENCES CITED

The following references are of record in the file of this patent:

UNITED STATES PATENTS

| Number | Name | Date |
|---|---|---|
| 1,452,591 | Brogger | Apr. 24, 1923 |
| 1,805,447 | Eshbaugh | May 12, 1931 |
| 2,002,445 | Arey et al. | May 21, 1935 |
| 2,196,898 | Faus | Apr. 9, 1940 |
| 1,948,912 | Geyger | Feb. 27, 1934 |
| 2,015,474 | Hartley et al. | Sept. 24, 1934 |
| 1,962,929 | Faus | June 12, 1934 |
| 2,153,777 | Swart | Apr. 11, 1939 |
| 1,169,475 | Finnigan | Jan. 25, 1916 |
| 2,355,940 | Quschlag | Aug. 15, 1944 |
| 2,313,967 | Read | Mar. 16, 1943 |